Oct. 16, 1928.

F. R. OWENS

PARACHUTE

Filed Aug. 10, 1927      2 Sheets-Sheet 2

Frank R. Owens, INVENTOR

BY *Victor J. Evans*

ATTORNEY

Patented Oct. 16, 1928.

1,687,884

UNITED STATES PATENT OFFICE.

FRANK R. OWENS, OF BEAVER CROSSING, NEBRASKA.

PARACHUTE.      REISSUED

Application filed August 10, 1927. Serial No. 212,055.

The present invention relates to parachutes and has for its principal object to provide a device of this character which will open without fail when making a descent therewith. Other objects are simplicity and cheapness of construction. Further objects and advantages will appear from the following specification and claims.

Figure 1:
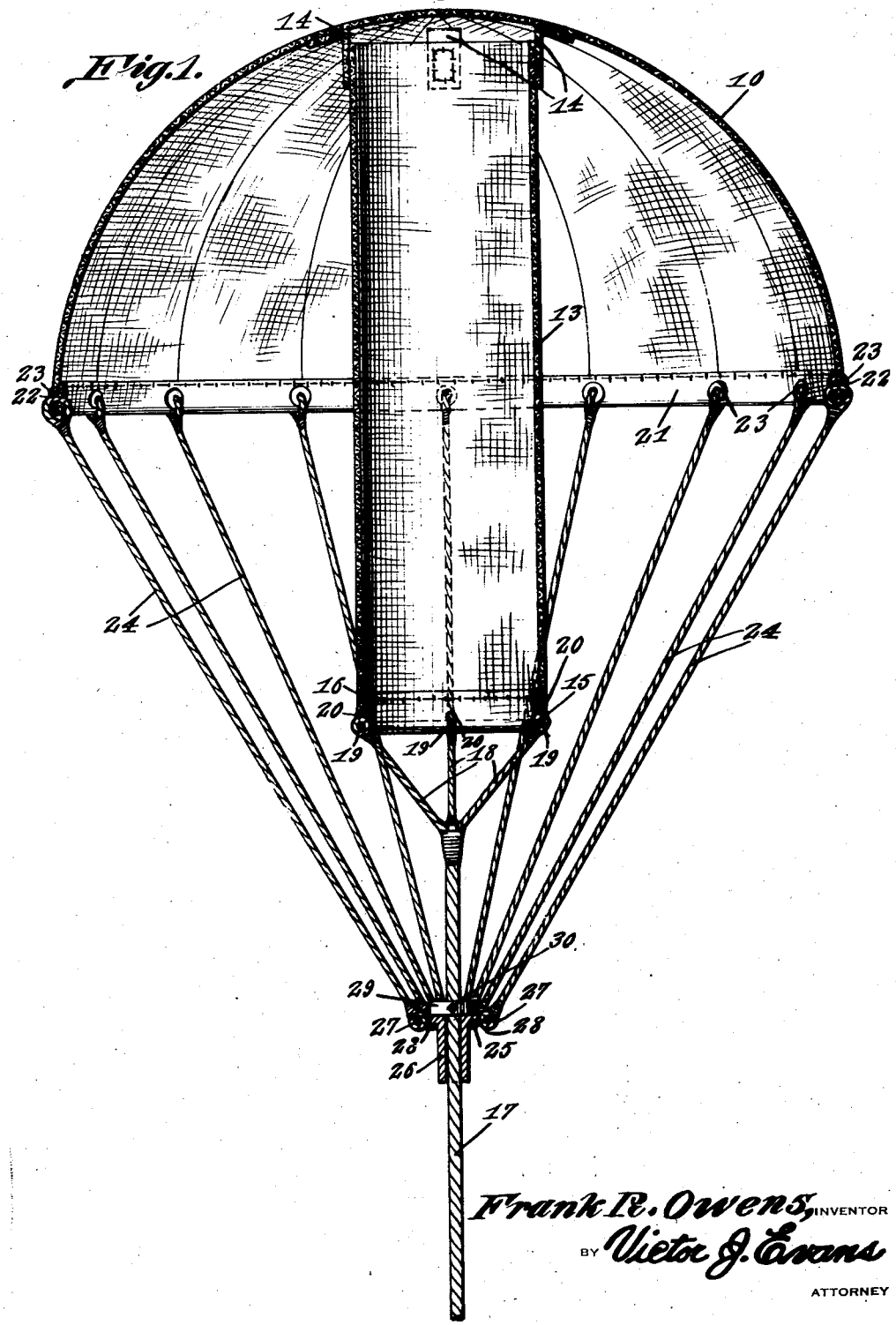
Figure 1 is a sectional view showing the parachute when open.
Figure 2:
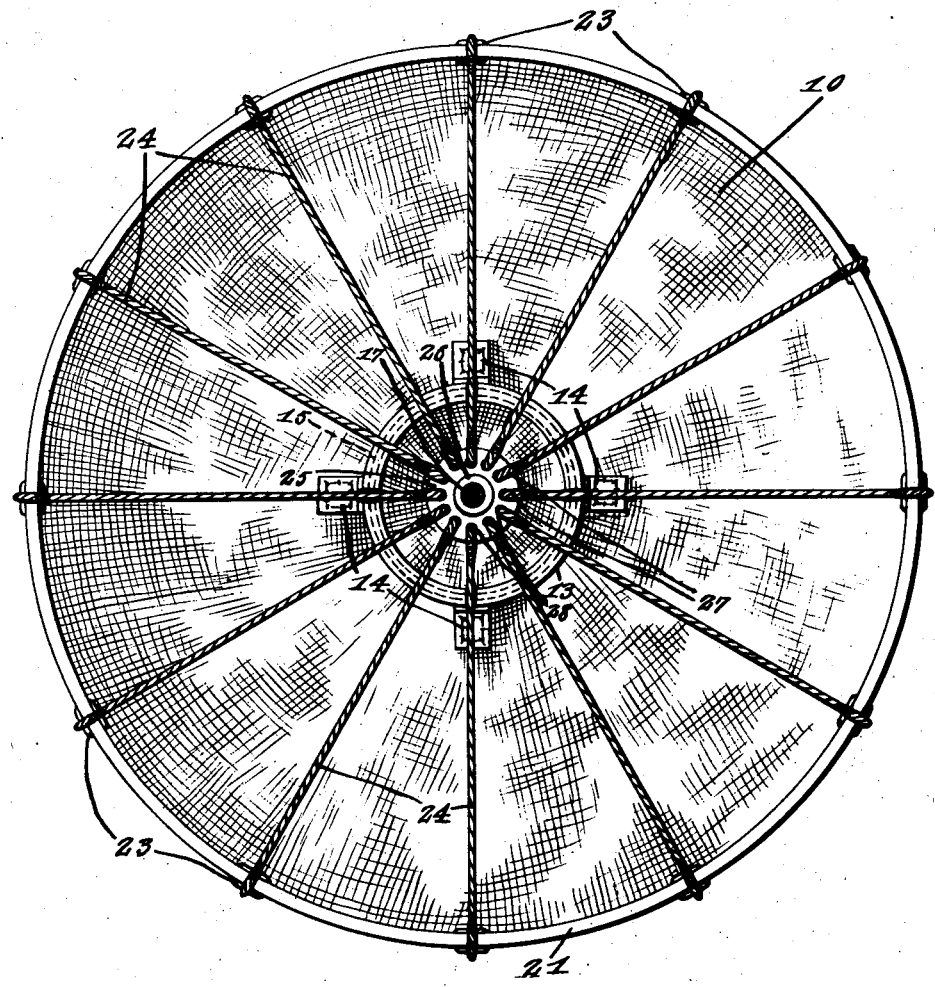
Figure 2 is a bottom plan view of the parachute when open.
Figure 3:
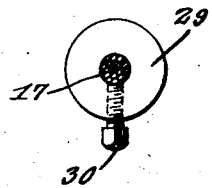
Figure 3 is a detail view showing the stop which prevents the parachute from opening beyond the desired spread.

Describing the invention in detail, provided within the dome of the parachute is a canvas tube 13 secured at its upper end to the body 10 and in spaced relation thereto by means of straps 14 of canvas or other suitable material which may be sewed to the body portion 10 and to the sides of the cylinder. There may be any number of these straps, but I prefer to use four, spaced at equal intervals about the cylinder. Bound in the lower end of the tube 13 I provide a metallic ring 15 which is held to the tube by folding the material thereabout and forming a line of stitches 16 therein. 17 is a rope to which the operator may hold in making a descent and the upper end of this rope is attached to the tube 13 by means of branches 18 spliced thereto and having their upper ends looped at 19 through apertures 20 about the ring 15. The lower edge of the dome of the parachute is folded upon itself to form a hem 21 and is provided with spaced apertures 22, the edges of which are bound by eyelets 23 and secured in these eyelets I provide a plurality of tie ropes 24, the upper ends of which are secured in the eyelets 23 and the lower ends converge to connect with the flange 25 formed on the ferrule 26 which is slidable on the rope 17. The ropes are connected to the flange 25 by looping the rope as at 27 through apertures 28 formed in said flange. A stop 29 is provided on the rope above the ferrule and is secured to the rope against sliding therealong by any suitable means as by a set screw 30. This stop is locked in such a position along the rope 17 so as to prevent the dome of the parachute from turning wrong side out. The tube 13, it will be noted, is of such a length that when the dome of the parachute is collapsed thereabout the lower end of the tube will project beyond the lower end of the dome of the parachute.

In operation it will be readily seen that when an operator is making a descent from a flying machine, when he throws the parachute to the breeze air will immediately pass through the tube 13 for the reason that the lower end thereof is held constantly open by the ring 15. Air passing upward through the tube will spread out from its upper end, filling the dome of the parachute and causing it to spread to open position, as shown in Figure 1. It is to be understood that the weight of the operator will all be on the lower end of the tube 13 until the dome of the parachute is fully open, from which time the weight will be on the ropes 24 and the parachute will support practically all of the weight. It will be readily seen that by the above construction danger of making a jump and having the parachute fail to open is practically eliminated and danger from said leaps in the air will be greatly minimized.

Having described my invention what I claim is:

1. A parachute having a dome of flexible material, a tube secured therein by one end, said end being in spaced relation to the dome of the parachute, a rigid ring secured in the lower end of the tube, a rope secured to said ring, ropes secured to the lower edge of the dome of the parachute and having a slidable connection with the first mentioned rope.

2. A parachute comprising a dome of flexible material, a tubular member having one end thereof secured within the dome of the parachute and in spaced relation to the walls thereof, a rigid ring secured in the lower end of the tube, a rope secured to said ring, a plurality of ropes connected in spaced relation to the lower edge of the dome of the parachute and having a sliding connection with the rope secured to the tube, said tube being of a length to project below the lower end of the body of the parachute when the same is collapsed about said tube.

3. In a parachute, a body portion of flexible material when opened in the form of a dome, a flexible tubular member having flexible connection with the top of the dome and being of a length to project beyond the lower end of the dome when the dome is collapsed thereabout, a ring secured in the lower end of the tube, a rope having branches connected to the tube, ropes connected to the lower edge of the dome of the parachute and having sliding connection with the rope connected to the tube, and a stop for preventing the sliding connection from sliding beyond a predetermined point on said rope.

In testimony whereof I affix my signature.

FRANK R. OWENS.